United States Patent [19]

Yanagi

[11] Patent Number: 5,152,419
[45] Date of Patent: Oct. 6, 1992

[54] CAP FOR RESERVE TANKS

[75] Inventor: Kunio Yanagi, Higashimatsuyama, Japan

[73] Assignee: Jidosha Kiki Co., Ltd., Tokyo, Japan

[21] Appl. No.: 608,195

[22] Filed: Nov. 2, 1990

[30] Foreign Application Priority Data

Dec. 20, 1989 [JP] Japan .................. 1-146764[U]

[51] Int. Cl.⁵ .............................................. B65D 51/16
[52] U.S. Cl. ......................... 220/374; 220/306; 220/DIG. 33; 215/307
[58] Field of Search ............... 220/367, 373, 374, 306, 220/DIG. 33; 215/307

[56] References Cited

U.S. PATENT DOCUMENTS

| | | | |
|---|---|---|---|
| 1,724,346 | 8/1929 | Ford | 220/374 X |
| 3,140,794 | 7/1964 | Arndt et al. | 220/374 X |
| 3,454,183 | 7/1969 | Fuchs | 220/374 X |
| 4,091,179 | 5/1978 | Szabo | 429/84 |
| 4,091,180 | 5/1978 | Fox et al. | 429/84 |
| 4,094,437 | 6/1978 | Hayashida | 220/374 |
| 4,136,796 | 1/1979 | Dubois et al. | 220/256 |
| 4,285,440 | 8/1981 | Adams | 220/202 |
| 4,337,875 | 7/1982 | Lyons | 220/368 |
| 4,349,122 | 9/1982 | Klar et al. | 220/373 |
| 4,392,584 | 7/1983 | Bauer | 220/374 |
| 4,514,984 | 5/1985 | Kubota | 60/585 |
| 4,624,286 | 11/1986 | Frohn | 137/859 |
| 4,666,057 | 5/1987 | Côme et al. | 220/368 |
| 4,921,124 | 5/1990 | Stammler et al. | 220/367 |

FOREIGN PATENT DOCUMENTS

| | | | |
|---|---|---|---|
| 1233681 | 2/1967 | Fed. Rep. of Germany | 220/374 |
| 2271139 | 12/1975 | France | 220/373 |
| 465664 | 9/1951 | Italy | 220/374 |
| 483539 | 8/1953 | Italy | 220/373 |
| 61-37067 | 3/1986 | Japan . | |

Primary Examiner—Stephen Marcus
Assistant Examiner—Stephen Cronin
Attorney, Agent, or Firm—McAulay Fisher Nissen Goldberg & Kiel

[57] ABSTRACT

The present invention relates to a cap for reserve tanks, wherein said cap has a vent path. The cap consists of an upper member and a lower member, wherein an annular rib is defined in the upper surface of the lower member. The annular rib is forced into abutment with the lower surface of said upper member so as to form an inner chamber and an outer chamber between said upper and lower members. A portion of said annular rib is extended in the central direction of the annular rib, and a groove or a hole is formed in the extention of the annular rib, said groove or hole allowing communication between said inner and outer chambers.

16 Claims, 2 Drawing Sheets

CAP FOR RESERVE TANKS

FIELD OF THE INVENTION AND RELATED ART STATEMENT

The present invention relates to a cap for reserve tanks, and more particularly to a cap for liquid reserve tanks for use in the master cylinder and the like.

In a liquid reserve tank, a reservoir chamber is opened to an atmosphere via a vent passage defined in a cap and the like, since it is required for the reservoir chamber to be constantly maintained at an atmospheric pressure.

Especially in an oil reservoir for a device mounted on vehicles, for example, a master cylinder, the vent passage is formed in a labyrinthine configuration, since there is a possibility that an oil contained in the reservoir chamber may possibly be leaked out to a surrounding atmosphere through the above-described vent passage as a result of vibration and the like of the vehicle.

FIG. 3 illustrates the oil reservoir used in such master cylinder.

The cap 2 of reserve tanks 1 is provided at its upper member 3 with an annular rib 4, and at its lower member 5 with first and second annular ribs 6 and 7. These upper and lower members 3 and 5 are integrated together in such a manner that the annular rib 4 may face toward the interior of the annular rib 6, while a plate 8 is contained inside the annular rib 6 and is retained in the rib 6 at the edge of the rib 4. The upper member 3 is provided at the edge of the rib 4 with a groove 4a, thereas the lower member 5 is provided at the edges of the ribs 6 and 7 with grooves 6a and 7a. In turn, a hole 5a is defined through the bottom wall of the rib 6 and a hole 8a is defined through the plate 8.

These ribs 4, 6 and 7, and the plate 8 serve to form a labyrinth between the upper and lower members 3 and 5, in combination with the grooves 4a, 6a, 7a, and holes 8a and 5a etc., In this type of cap 2, a sealing member 10 which has been engaged with the reserve tank 9 and arranged along the circumferential surface of the lower member 5 is brought into abutment against the inner circumferential surface of the reserve tank 9 so as to create a seal between the cap 2 and the reserve tank body 9.

Accordingly, in the oil reserve tank 1, a reservoir chamber 11 is opened to an atmosphere through the holes 5a and 8a, and grooves 6a and 7a, and further through a clearance 12 between the upper and the lower members of the cap 2, and a clearance 13 and the like between the upper member 3 and the reserve tank body 9 o the cap 2.

In the oil reserve tank of a type as above-described, there is a possibility that an oil is leaked outside the rib 7 flowing through the groove 7a and further flowed to an area outside the reserve tank 1, in an event that the oil is accumulated in a space between the ribs 6 and 7 through holes 5a and 8a, and the groove 6a, and the oil reserve tank 1 is caused to incline with the presence of oil in the space.

In order to reliably prevent the occurrence of such oil leakage, it is required to form the labyrinth in a more complicated configuration, and thus the upper and the lower members may accordingly become increasingly complicated in their constructions.

OBJECTS AND SUMMARY OF THE INVENTION

It is therefore an object of the present invention to provide a cap for reserve tanks which is adapted to reliably prevent the occurrence of the leakage of oil with a simplified construction.

The present invention provides a cap for reserve tanks, wherein upper and lower members are utilized to define a hollow portion, and an annular rib is formed in the surface of the lower member which abuts against the upper member, whereas said hollow portion is divided into inner and outer chambers by bringing the annular rib into close contact with said upper member. The inner chamber is communicated with the interior of the reserve tank body, and said inner and outer chambers are communicated with each other through a groove or a hole defined in the upper portion of said annular rib. Furthermore, said outer chamber is communicated with the exterior of said reserve tank body so as to form a labyrinth in said hollow portion, and the interior of said reserve tank body is communicated with the exterior of the reserve tank body through the labyrinth. The annular rib has its portion extended in the central direction of the annular rib, and said groove or hole is defined in the above extention of the annular rib.

In the cap for reserve tanks in accordance with the present invention, a groove of the rib defined in the lower member is disposed to orient upwardly, i.e., a liquid outflow port is arranged more centrally compared to the rib, which implies that said outflow port may keep its height substantially at a constant even if the reservoir is inclined, and thereby allowing the liquid to be retained in the rib.

As described hereinbefore, the cap for reserve tanks in accordance with the present invention has a portion of an annular rib extending towards the central direction of said rib, the annular rib forming a plurality of chambers, and a groove or a hole is provided in the extention of the annular rib so as to define a vent passage.

Accordingly, it is not needed for the cap for reserve tanks in accordance with the present invention to have a rather complicated labyrinth, and thereby realizing a simplified construction. Consequently, a mold can be formed inexpensively to reduce the total manufacturing cost.

BRIEF DESCRIPTION OF THE DRAWINGS

FIG. 1 and FIG. 2 show a cap for reserve tanks in accordance with the present invention, wherein FIG. 1 is a vertical cross-sectional view of the cap and FIG. 2 is a plan view of the lower member which forms one component of the cap;

DETAILED DESCRIPTION OF PREFERRED EMBODIMENTS

Figure 1:
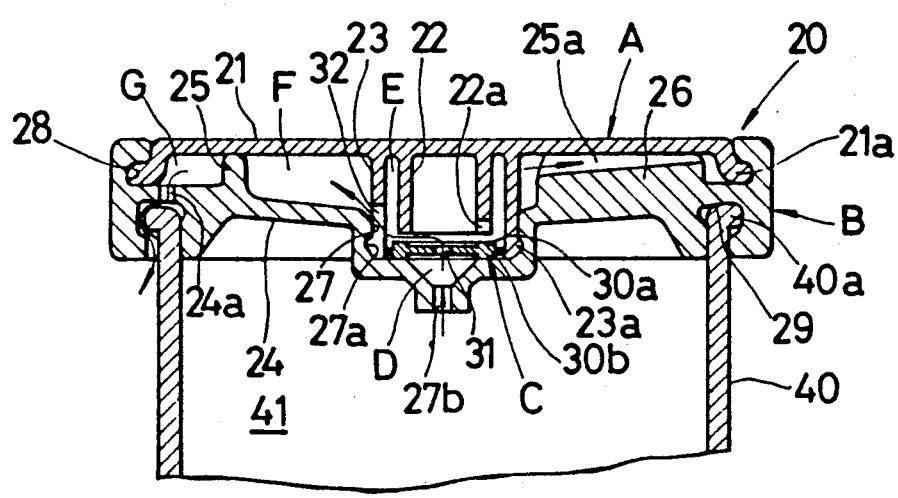
Figure 2:
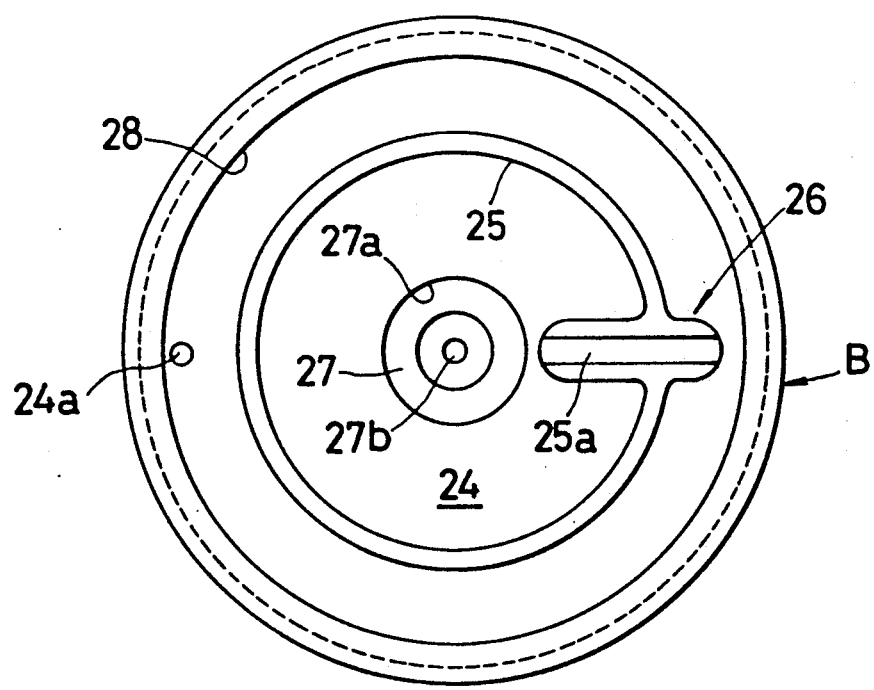
Figure 3:
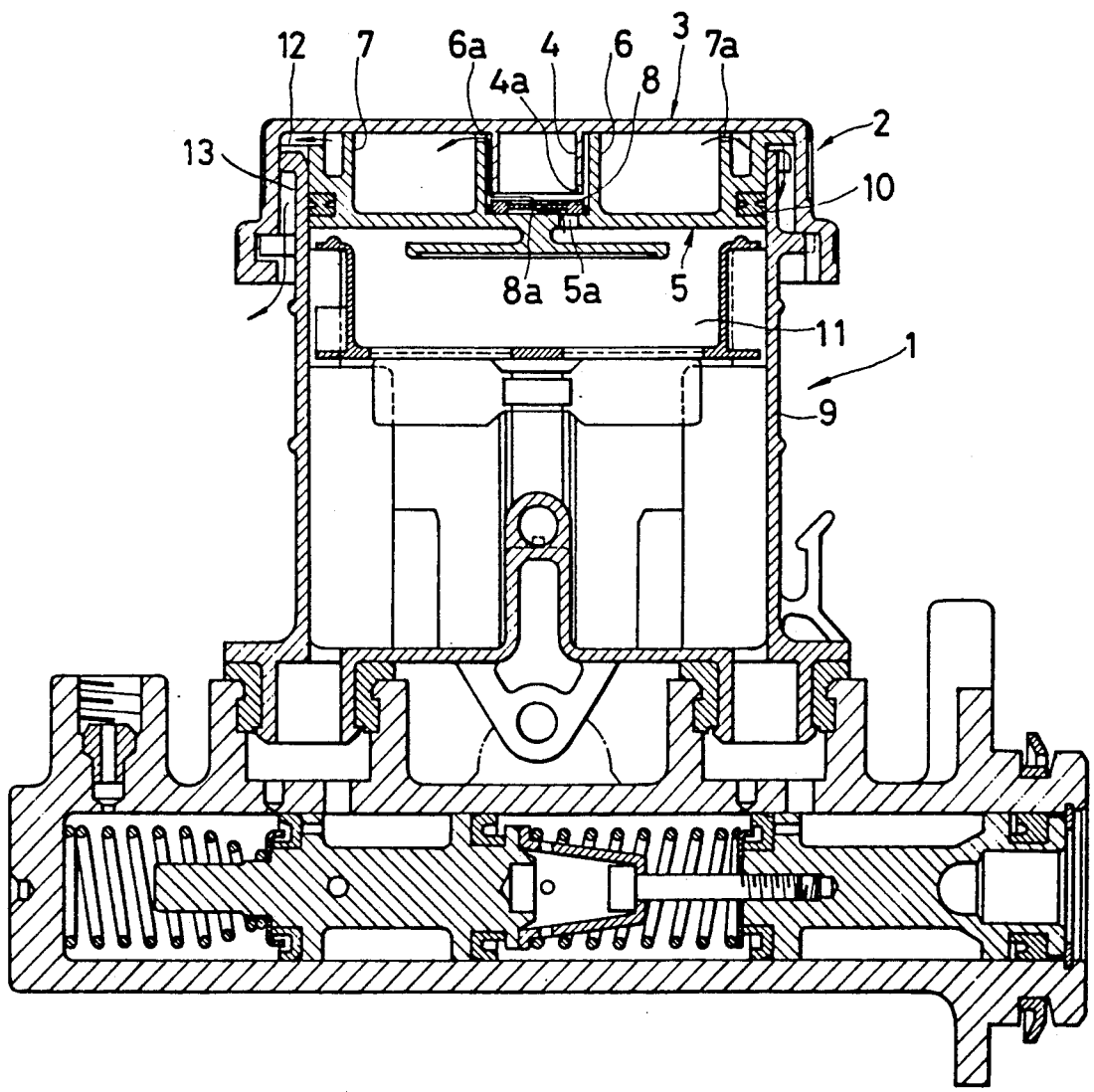
FIG. 3 is a vertical cross-sectional view of the oil reservoir having a traditional cap for reserve tanks.

FIG. 1 and FIG. 2 illustrate a cap for reserve tanks in accordance with the present invention.

The cap 20 or reserve tanks comprises a upper member A, a lower member 8 and a plate C.

The upper member A is formed from a synthetic resin such as polypropylene and the like, having a first annular rib 22 and a second annular rib 23 provided on a disk-shaped main body 21. These annular ribs 22 and 23 are formed concentrically. A groove 22a is formed on the edge of the first annular rib 22 which is arranged inwardly, and a plurality of pawls 23a is upstandably defined in the edges of the second annular rib 23 which is arranged outwardly.

On the other hand, the lower member B is formed from rubber, having an annular rib 25 provided on a disk-shaped main body 24. The annular rib 25 has a boss 26 formed on a part thereof which projects radially, and a groove 25a is formed in the upper surface of the boss 26. The groove 25a increases its depth progressively toward the center of the main body 24. A recess 27 is formed in the central portion of the main body 24, having an annular engaging groove 27a which is formed in the circumferential wall thereof for receiving the pawl 23a of the upper member A, and a funnelshaped hole 27b which is formed in the central portion of the recess 27. The main body 24 has an annular engaging groove 28 for receiving the circumferential portion 21a of the upper member A and an annular groove 29 for receiving the upper edge 40a of the reserve tank body 40, these annular grooves 28 and 29 being formed in the circumferential portion of the main body 24. A hole 24a is defined through the outer surface of the annular rib 25 of the main body 24.

A plate C is formed from a synthetic resin such as polypropylene and the like, having an annular ribs 30a and 30b formed in the upper and the lower surfaces thereof respectively, and a hole 31 defined in the central portion thereof.

The upper and the lower members A and and the plate C which are thus formed are integrated as a unit in such a manner that the upper member A may mate with the lower member 8 with the plate C received in the recess 27 in the lower member, and with the pawl 23a of the upper member A received in the engaging groove 27a of the lower member 8, whereas the circumferential portion 21a of the upper member A is engaged with the engaging groove 28 of the lower member B.

In the cap 20 for reserve tanks which is integrated as a unit as above-described, a chamber D is defined by the plate C and the funnel-shaped hole 27 defined in the lower member 8, and a chamber E is defined in the annular rib 23 by the plate C and the upper member A, whereas a chamber F is defined by the upper member A and the lower member B between the annular ribs 23 and 25, and a chamber G is defined outwardly of the rib 25 by the upper member A and the lower member 8.

The cap 20 is attached to the reserve tank body 40 by receiving the upper edge 40a of the reserve tank body 40 within the groove 29 of the lower member 8.

In the reservoir having the cap 20 attached as above-described, a reservoir chamber 41 is opened to atmosphere via the hole 27b, the chamber D, the hole 31, the chamber E, a clearance 32, the chamber F, the groove 25a, the chamber G and the hole 24a.

In this reservoir, if an oil in the reservoir chamber 41 leaks to the chamber F flowing through holes 27b and 31, and the clearance 32, such oil can be immediately returned back to the reservoir chamber 41 through holes 31 and 27b. Additionally, even if the oil is leaked into the chamber F when the reservoir is in a inclined position, further outflow of the oil into the chamber G is prevented, because the inner end of the groove 25a is maintained at an elevated position.

Meanwhile, although the groove 25a is defined on the boss 26 so as to ensure communication between chambers F G in the above-described embodiment, the groove 25a may be naturally substituted for a hole.

I claim:

1. A cap for reserve tanks comprising:

an upper member having a wall surface and a lower member having a wall surface;

said lower member having an annular rib projecting upwardly from its wall surface;

means for releasably coupling said upper member and said lower member together to form said cap having a central portion and a peripheral portion;

said annular rib having a distal end portion in contact with the wall surface of said upper member when said upper and lower members are coupled together to define a first chamber and a second chamber in said cap;

said first chamber disposed inwardly from said rib toward the central portion of said cap and said second chamber disposed outwardly from said rib toward the peripheral portion of said cap;

said rib having an elongated laterally extending portion projecting inwardly toward the central portion of said cap;

means on said cap adapted for releasably mounting said cap to a reserve tank; and labyrinth passage means in said cap for venting the tank to atmosphere;

said passage means comprising a first passageway in said lower member providing communication between the interior of the tank and said inner chamber, a second passageway in the laterally extending portion of said rib extending between said inner chamber and said outer chamber, and a third passageway in said lower member providing communication between said outer chamber and the atmosphere.

2. The cap as claimed in claim 1, wherein the laterally extending portion of said rib has an upper surface, and said second passageway is formed in said upper surface.

3. The cap as claimed in claim 1, wherein said second passageway has an inlet end and an outlet end, said inlet end being located in said inner chamber, and said second passageway being inclined over the length thereof with its inlet end being positioned lower than its outlet end.

4. The cap as claimed in claim 3, wherein the inlet end of said second passageway is located inwardly adjacent the central portion of said cap.

5. The cap as claimed in claim 4, wherein said second passageway is tapered to from the opening of its inlet end larger than the opening of its outlet end.

6. The cap as claimed in claim 1, wherein said second passageway is formed in the upper surface of said laterally extending rib portion, said second passageway having an inlet end located in said inner chamber and an outlet end located in said outer chamber, the upper surface of said rib portion being inclined over the length thereof with the inlet end of said second passageway being position lower than the outlet end of said passageway.

7. The cap as claimed in claim 8, wherein the inlet end of said second passageway is located inwardly adjacent the central portion of said cap.

8. The cap as claimed in claim 7, wherein said second passageway is tapered to from the opening of its inlet end larger than the opening of its outlet end.

9. The cap as claimed in claim 1, wherein said first passageway is disposed adjacent the central portion of said cap and said third passageway is disposed adjacent to the peripheral portion of said cap.

10. The cap as claimed in claim 1, wherein said upper chamber has an annular rib projecting downwardly from its wall surface, said means four coupling said upper and lower members together comprising a plurality of pawls projecting outwardly from said downwardly projecting rib and a plurality of grooves formed in the wall surface of said lower member, said grooves being sized to frictionally receive therein a separate one of said pawls.

11. The cap as claimed in claim 10, wherein said upper member has a peripheral edge and said lower member has a flange extending around the periphery thereof, and said means for coupling said upper and lower members together further comprises an annular groove formed in said flange, said annular groove being sized to frictionally receive therein the peripheral edge of said upper member.

12. The cap as claimed in claim 10, wherein said lower member has a recessed portion projecting downwardly of the central portion of said cap, said recessed portion having a bottom wall, said first passageway being formed in the bottom wall of said recesses portion, and a plate fitted within said recessed portion, said plate having an opening therein in communication with said first passageway.

13. The cap as claimed in claim 12, wherein said recessed portion has a peripheral wall surface, the plurality of grooves in said lower member being formed in the peripheral wall of said recessed portion, the downwardly projecting rib of said upper member having a distal end portion fitted within said recessed portion, and said plurality of pawls projecting outwardly from the distal end of said downwardly projecting rib for engagement with said plurality of grooves, said downwardly projecting rib defining a wall of said inner chamber, and said passage means further comprising a fourth passageway in said wall of said inner chamber in communication with the opening in said plate thereby to provide communication between said recessed portion and said inner chamber.

14. A cap for reserve tanks comprising:
an upper member having a wall surface and a lower member having a wall surface;
said upper member having an annular rib projecting downwardly from its wall surface and said lower member having an annular rib projecting upwardly from its wall surface;
means for releasably coupling said upper member and said lower member together to form said cap having a central portion and a peripheral portion;
the upwardly projecting rib of said lower member having a distal end portion in contact with the wall surface of said upper member when said upper and lower members are coupled together to define a first chamber and a second chamber in said cap;
said first chamber disposed inwardly from the upwardly projecting rib of said lower member toward the central portion of said cap and said second chamber disposed outwardly from said upwardly projecting rib toward the peripheral portion of said cap;
the upwardly projecting rib of said lower member having an elongated laterally extending portion projecting inwardly toward the central portion of said cap, said laterally extending portion having an upper surface;
said lower member having a recessed portion projecting downwardly of the central portion of said cap, said recessed portion having a bottom wall and a peripheral wall surface;
the downwardly projecting rib of said upper member having a distal end portion fitted within the recessed portion of said lower member, said downwardly projecting rib defining a wall of said inner chamber;
said upper member having a peripheral edge and said lower member having a flange extending around the periphery thereof;
said means for coupling said upper and lower members together comprising a plurality of pawls projecting outwardly from the distal end of said downwardly projecting rib and a plurality of grooves formed in the peripheral wall of said recessed portion, said grooves being sized to frictionally receive therein a separate one of said pawls;
said coupling means further comprising an annular groove formed in the flange of said lower member, said groove being sized to frictionally receive therein the peripheral edge of said upper member;
a plate fitted within the recessed portion of said lower member, said plate having an opening therein;
means on said lower member adapted for releasably mounting said cap to a reserve tank; and
labyrinth passage means in said cap for venting the tank to atmosphere;
said passage means comprising a first passageway in the bottom wall of the recessed portion of said lower member, a second passageway in the upper surface of the laterally extending portion of the upwardly projecting rib of said lower member, a third passageway in said lower member adjacent the flange thereof, and a fourth passageway in the wall of said inner chamber defined by the downwardly projecting rib of said upper member;
said passage means providing communication between the interior of the tank and said inner chamber through said first passageway, said plate opening and said fourth passageway, and providing communication between said inner chamber and said outer chamber through said second passageway, and providing communication between said outer chamber and atmosphere through said third passageway.

15. The cap as claimed in claim 4, wherein said second passageway has an inlet end located in said inner chamber adjacent the central portion of said cap and an outlet end located in said outer chamber, the upper surface of the laterally extending portion of the upwardly projecting rib of said lower member being inclined over the length thereof with the inlet end of said second passageway being positioned lower than the outlet end of said passageway.

16. The cap as claimed in claim 15, wherein said second passageway is tapered to form the opening of its inlet end larger than the opening of its outlet end.

* * * * *